United States Patent [19]

Ninomiya et al.

[11] 4,139,107
[45] Feb. 13, 1979

[54] SPREADER POSITIONING APPARATUS FOR AUTOMATICALLY GRASPING A HANDLING ARTICLE

[75] Inventors: Yasumasa Ninomiya, Urawa; Yasuo Nabeshima, Kudamatsu; Kengo Sugiyama, Abiko; Yozo Hibino, Ibaraki, all of Japan

[73] Assignees: Hitachi, Ltd.; Japanese National Railways, Japan

[21] Appl. No.: 841,922

[22] Filed: Oct. 13, 1977

[30] Foreign Application Priority Data

Oct. 20, 1976 [JP] Japan .................................. 51-124810
Oct. 20, 1976 [JP] Japan .................................. 51-124811

[51] Int. Cl.² ............................................ B66C 13/46
[52] U.S. Cl. ........................................ 214/40; 212/128
[58] Field of Search ............. 214/38 CA, 40; 212/128

[56] References Cited

U.S. PATENT DOCUMENTS

3,891,100  6/1975  Tamaki et al. .................. 214/38 CA

FOREIGN PATENT DOCUMENTS

99833 12/1973 Japan ......................................... 214/40
72045  6/1976 Japan ......................................... 214/40
35298 10/1976 Japan ......................................... 214/40

*Primary Examiner*—Robert G. Sheridan
*Attorney, Agent, or Firm*—Craig & Antonelli

[57] ABSTRACT

An apparatus with sensor mounted on a spreader for handling articles of a rectangular parallelepiped shape for detecting elements in plate form attached to both sides of such handling articles and both sides of the handling article loading and unloading bed of freight cars and trucks for conveying such handling articles, in order to position the spreader by detecting the detecting plate by the sensor. The sensor detects the deflections of the spreader with respect to the detecting plate, and the spreader is slightly moved for correcting the deflections so as to accurately position the spreader with respect to the article or the bed of a freight car or a truck.

7 Claims, 24 Drawing Figures

SPREADER POSITIONING APPARATUS FOR AUTOMATICALLY GRASPING A HANDLING ARTICLE

LIST OF PRIOR ART REFERENCE (37 CFR 1.56 (a))

Japanese Patent Publication No. 35298/1976 Tamaki et al.
Japanese Patent Laid-Open Publication No. 99833/1973 Tamaki et al.
U.S. Pat. No. 3,891,000 Tamaki et al.
Japanese Patent Laid-Open Publication No. 72045/1976 Sugiyama

BACKGROUND OF THE INVENTION

This invention relates to apparatus for positioning the spreader for grasping, loading and unloading of containers or other handling articles of a rectangular parallelepiped shape. More particularly, the invention is concerned with a novel apparatus for positioning such spreader relative to the handling article loading and unloading bed of a freight car, the handling article loading and unloading bed of a truck or a handling article of the type described, which apparatus has particular utility in article handling apparatus for carrying out unloading of desired articles from a train of freight cars and transfer of such handling articles to a predetermined zone or trucks and vice versa.

Although the articles handled by the apparatus according to the invention are not limited to containers, the invention will be described hereinafter by way of example with reference to a container loading and unloading crane mounting such a spreader for better understanding of the invention.

At a terminal or yard, when loading and unloading containers between freight cars and trucks, in order to load and unload containers accurately, quickly and efficiently of the gantry type crane is usually equipped there. Such a container loading and unloading crane has been proposed by our company in Japanese Patent Application No. 31653/72 (Laid-Open Patent Application No. 99832/73 and Patent Publication No. 35298/76) and Japanese Patent Application No. 31654/72 (Laid-Open Patent Application No. 99833/73). Also, an invention has been developed by us in connection with full automation of container loading and unloading operation at a container terminal or yard so as to effect full automation of a container yard. Such a invention has been issued as U.S. Pat. No. 3,861,100.

When using a container loading and unloading crane automatically, it is necessary to perform the following operations:

1. Providing an address to each of freight cars with respect to a position on the ground in order to indicate to the crane the container to be handled;
2. Positioning the crane to an instructed location. This involves moving the crane to the predetermined instructed position by judging the travelling direction of the crane, the traversing direction of a trolley disposed on the crane for supporting the spreader for grasping articles, and the direction of lifting movement of the spreader after comparing the present position of the crane with the instructed position; and
3. Positioning the spreader for grasping the container supported by the trolley on the crane with respect to a container, the bed of a freight car or the bed of a truck. That is, a container grasping operation is performed by registering twist lock pins of the container grasping spreader with respective openings formed at four corners of the upper edge of the container. But, it is very difficult to stop the crane precisely at the instructed position within about ±10 mm. Thus it is necessary to detect deflection in the relative positions of the container grasping spreader and the container, the bed of the freight car or the bed of the truck, and then to adjust finely the position of the spreader by slightly moving the latter so as to position the spreader accurately with respect to the container.

Of the three operations described above, the operation set forth in paragraph (3) must be performed with a high degree of precision because it is an important operation in grasping, loading and unloading containers safely and positively. In positioning a spreader with respect to a container, the bed of a freight car or a truck, it has hitherto been usual practice to use a container itself as a target for detection when the container is to be grasped and to use container clamping fixtures attached to freight cars or the like as targets for detection when the container is to be unloaded. Containers, the bed of a freight car and a truck have no member mounted thereon which would serve as a target for detection. Thus a large number of contact-type sensor and non-contact-type sensor must be used as a sensor, and this is a disadvantage for the sensors and their logical circuit to be complex in construction. Also, spreader positioning apparatus of the prior art use basically mechanical sensor of the contact type in many cases. There is a defect when using such sensors, damaged by the container or the container clamping fixtures mounted on freight cars.

In order to solve these problems arising with regard to the prior art and to obviate the disadvantages thereof, an invention has been developed in connection with positioning of a spreader and disclosed in Japanese Patent Application No. 145570/74 (Laid-Open Patent Application No. 72045/76). According to this invention, detecting plate serving as targets for detection are attached only to the bed of a freight car and a truck, and the sensor is changed to the non-contact type so as to simplify the control system for positioning a spreader with respect to the bed of a freight car or a truck.

It should be noticed that the aforesaid apparatus for positioning a spreader used no detected elements attached to containers themselves and serving as targets for detection. Therefore, according to the invention, the spreader is provided as means for positioning the spreader with respect to a container or particularly for positioning the spreader with respect to the container carrying freight car travelling direction, with a plurality of detectors of the non-contact type connected to a circuit capable of making a logical decision and effecting control accordingly. It is true that this apparatus for positioning a spreader has a more simplified detecting mechanism than similar apparatus of the prior art. However, this apparatus has a disadvantage in simple system of the spreader because it is not easy to carry out its maintenance and inspection.

SUMMARY OF THE INVENTION

An object of this invention is to provide an apparatus for positioning a spreader which enables the operation of grasping articles of a rectangular parallelepiped shape fixing on the bed of a freight car, and a truck or a temporarily storing area and the operation of placing such articles at such places to be carried out positively and quickly.

Another object is to provide an apparatus for positioning a spreader which is simple in construction and which makes it possible to position a spreader with respect to any of objects including an article of a rectangular parallelepiped shape, the bed of a freight car and a truck with a high degree of efficiency and reliability.

Another object is to provide an apparatus for positioning a spreader which requires a small sum of capital investment.

In accordance with the present invention, there is provided an apparatus for positioning a spreader for handling articles of a rectangular parallelepiped shape wherein such spreader is first positioned in the direction of height (Z) and then the spreader is slightly moved in the longitudinal direction (X), in the transverse direction (Y), and in the angular direction ($\theta$) about the center axis thereof so as to accurately position the spreader with respect to one of such articles, the bed of a freight car or a truck, such apparatus comprising detecting plate attached to the marginal portions of both sides of such articles and serving as targets for detection when a desired article is searched; detecting plates attached to the portions of the sides of the loading areas of freight cars and trucks for conveying the articles which register with the longitudinal ends of the articles, so that the detecting plates can serve as targets for detecting the position in which the desired article is loaded; a columnar member mounted on a trolley of a crane for vertical movement and supporting at its lower end the spreader through a fine adjustment device; sensor arms connected for telescopic movement in the vertical direction to at least three of four corners of the spreader; sensor blocks each affixed to the lower end of one of said sensor arms; and sensor mounted at said sensor blocks for detecting the amounts of deflections of the spreader in the Z-direction, Y-direction, $\theta$-direction and X-direction by using at least said detecting plates as targets for detection.

Additional and other objects, features and advantages of the invention will become evident from the description set forth hereinafter when considered in conjunction with the accompanying drawings.

DESCRIPTION OF THE PREFERRED EMBODIMENT

Figure 1:
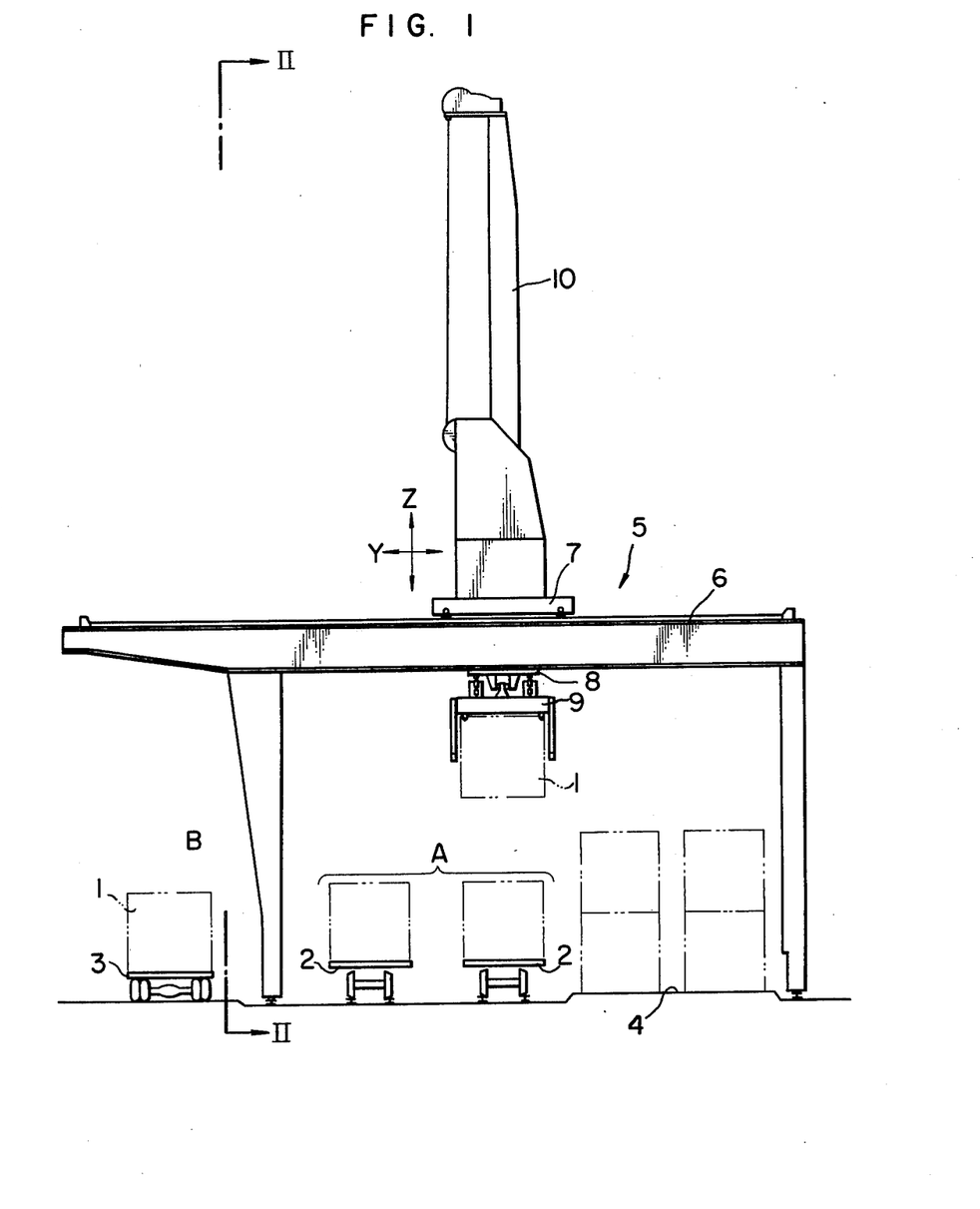
FIG. 1 is a front elevational view showing a container yard having a container crane incorporating therein the apparatus according to the present invention.
Figure 2:
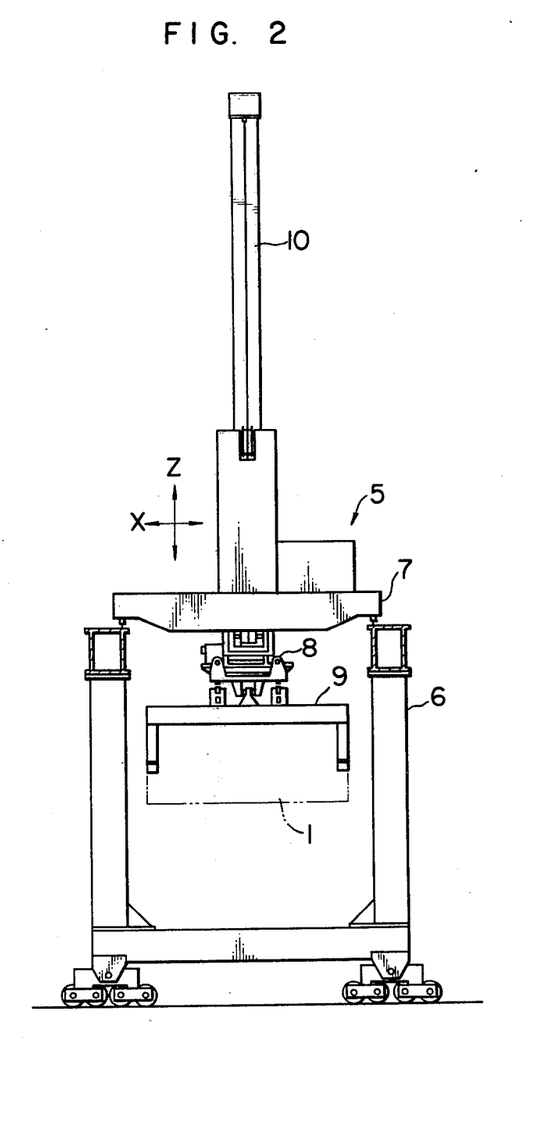
FIG. 2 is a side elevational view of the container crane of FIG. 1 as viewed along the line II—II of FIG. 1.

FIGS. 1 and 2 show a container yard equipped with a container crane 5 which mounts thereon a positioning apparatus according to the invention. As shown in the drawings, the container yard comprises an area A where freight cars 2 carrying containers 1 thereon enter and exit an area B where trucks 3 carrying the containers 1 thereon enter and exit, an area 4 for temporarily storing the containers 1, and a container crane 5 arranged in a manner to straddle the area A for the freight cars 2 and the area 4.

The container crane 5 comprises a crane body 6 adapted to travel in the travelling direction of the freight cars (hereinafter referred to as an X-direction), a trolley 7 adapted to traverse along a girder 6a of the crane body 6 in a direction transvers to the direction of the freight cars 2 (hereinafter referred to as a Y-direction), and a columnar member 10 mounted on the trolley 7 for movement in a vertical direction (hereinafter referred to as a Z-direction) and supporting a spreader 9 through a fine adjustment device 8. The spreader 9 can in turn be moved slightly by the fine adjustment device 8 in the X-direction and in the Y-direction and in the yaw direction about the center axis of the columnar member 10 (hereinafter referred to as a $\theta$-direction).

Figure 3:
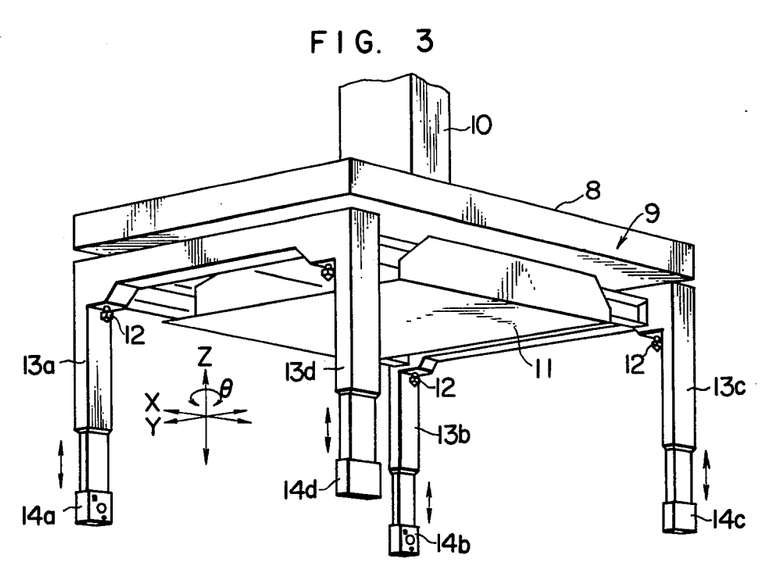
FIG. 3 is a perspective view of the spreader provided with the apparatus according to the invention.
Figure 4:
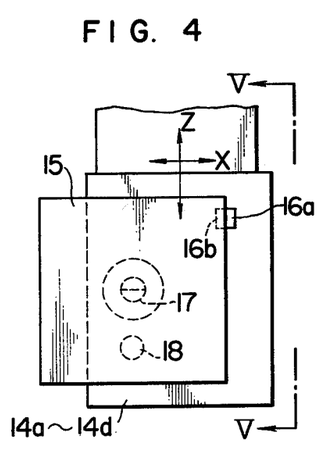
FIG. 4 is a front view of one example of one of sensor blocks or detecting plates according to the invention.
Figure 5:
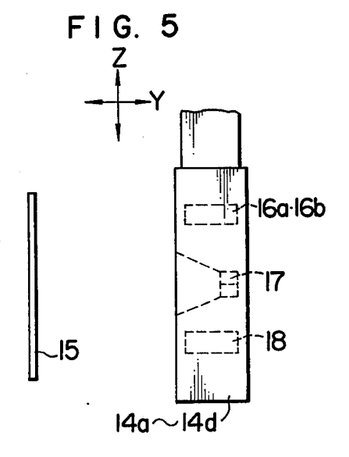
FIG. 5 is a side view of the sensor block of FIG. 4 as viewed along the line V—V in FIG. 4.

FIG. 3 shows the spreader 9 in a perspective view. As shown, the spreader 9 is constructed such that a main body 11 thereof can vary its length in the X-direction. The spreader 9 has twist locks 12 and extensible sensor arms 13a-13d at four corners thereof. The sensor arms 13a-13d mount at their lower ends sensor blocks 14a-14d, respectively. As shown in FIGS. 4 and 5, each of the sensor blocks 14a-14d mounts thereon two X-direction detecting sensors 16a, 16b which may, for example, be photoelectric switches for detecting the top edge of a detecting plate 15 to be described hereinbelow, a Y and $\theta$-direction detecting sensor 17 in the form of an ultrasonic switch for detecting a distance to the detecting plate 15 therefrom, and a Z-direction detecting sensor 18 in the form of a photoelectric switch for detecting the top edge of the container or the detecting plate 15. The Y and $\theta$-direction sensor 17 is disposed in each of the sensor blocks 14a-14d in such a manner that ultrasonic wave stroke the central portion of each of the detecting plates 15, while the X-direction detecting sensors 16a, 16b are disposed in each of the sensor blocks 14a–14d in such a manner that they can position the spreader 9 by utilizing the top edge of each of the detecting plates 15.

Figure 6:
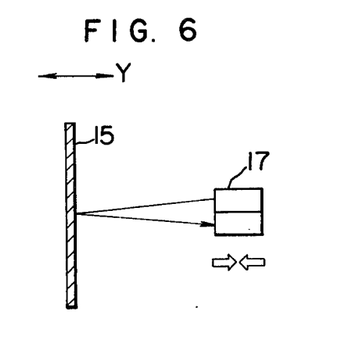
FIG. 6 is a view in explanation of the operation of the Y-$\theta$-direction detecting sensor using ultrasonic pulse.

The Z-direction detecting sensor 18 is mounted in the lower portion of each of the sensor blocks 14a–14d in such a manner that when the spreader 9 is moved downwardly, the sensor detects the top edge of the container 1 or each detecting plate 15 to determine the position of the spreader 9 in the Z-direction. Photoelectric switches for the X-direction detecting sensors 16a, 16b and the Z-direction detecting sensor 18 may be either of the reflection type or the transmission type. Alternatively, ultrasonic switches may be used as the sensors 16a, 16b and 18. As shown in FIG. 6, the Y and θ-direction sensor 17 consists of a wave transmitting section for ejecting pulses of ultrasonic wave and a wave receiving section for receiving the wave reflected from one of the detecting plate, so that the time period during which the wave is ejected from the wave transmitting section and then returns to the wave receiving section is measured. The time period is converted into a physical distance which represents the distance between the sensor 17 and the detecting plate 15.

Figure 7:
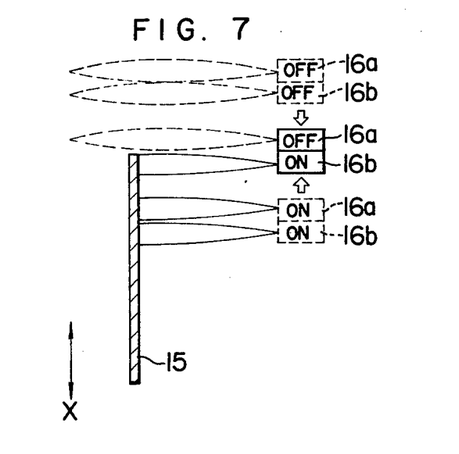
FIG. 7 is a view in explanation of the operation of the X-direction detecting sensors.

The X-direction detecting sensors 16a, 16b serve to determine the positions thereof with respect to the detecting plate 15, so that the spreader can be positioned with respect to the associated detecting plate 15. As shown in FIG. 7, when the two sensors 16a, 16b are both in ON or OFF positions, the sensors generate a signal for dictating the fine adjustment device 8 to slightly move the sensors 16a, 16b, and generate a positioning completion signal to the fine adjustment device 8 when the outer sensor 16a is moved to the OFF position and the inner sensor 16b is moved to the ON position.

Figure 8:
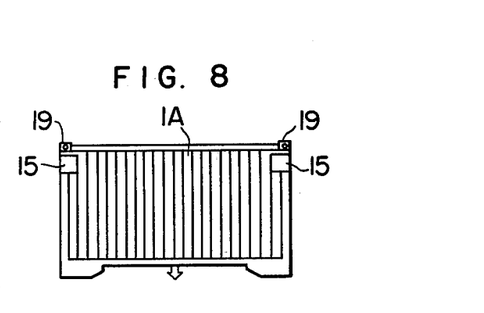
FIG. 8 is a front view of a 5-ton container having detecting plates attached thereto.

FIG. 8 shows a five-ton container 1A to which this invention is applied. The five-ton container 1A mounts at four corners at the upper surface thereof metal fixtures 19 adapted to receive the twist locks 12 of the spreader. Detecting plates 15 are attached to the container at the portions below the fixtures in such a manner that one edge of each detecting plate 15 is aligned with one end of the container 1A. In a like manner, ten-ton containers 1B are provided with detecting plates.

Figure 9:
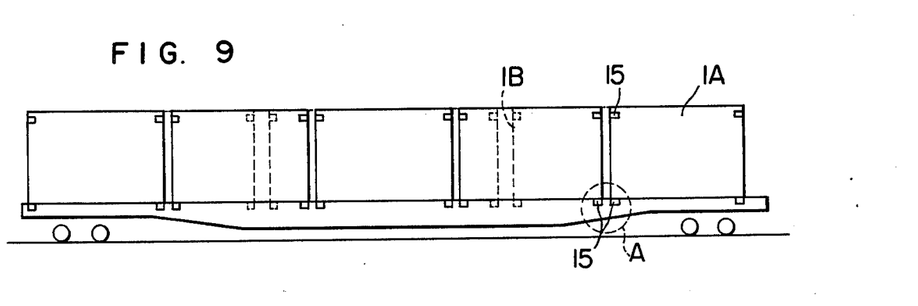
FIG. 9 is a front view of a freight car having detecting plates attached thereto, shown with a plurality of containers loaded thereon.
Figures 10, 11, 12, 13:
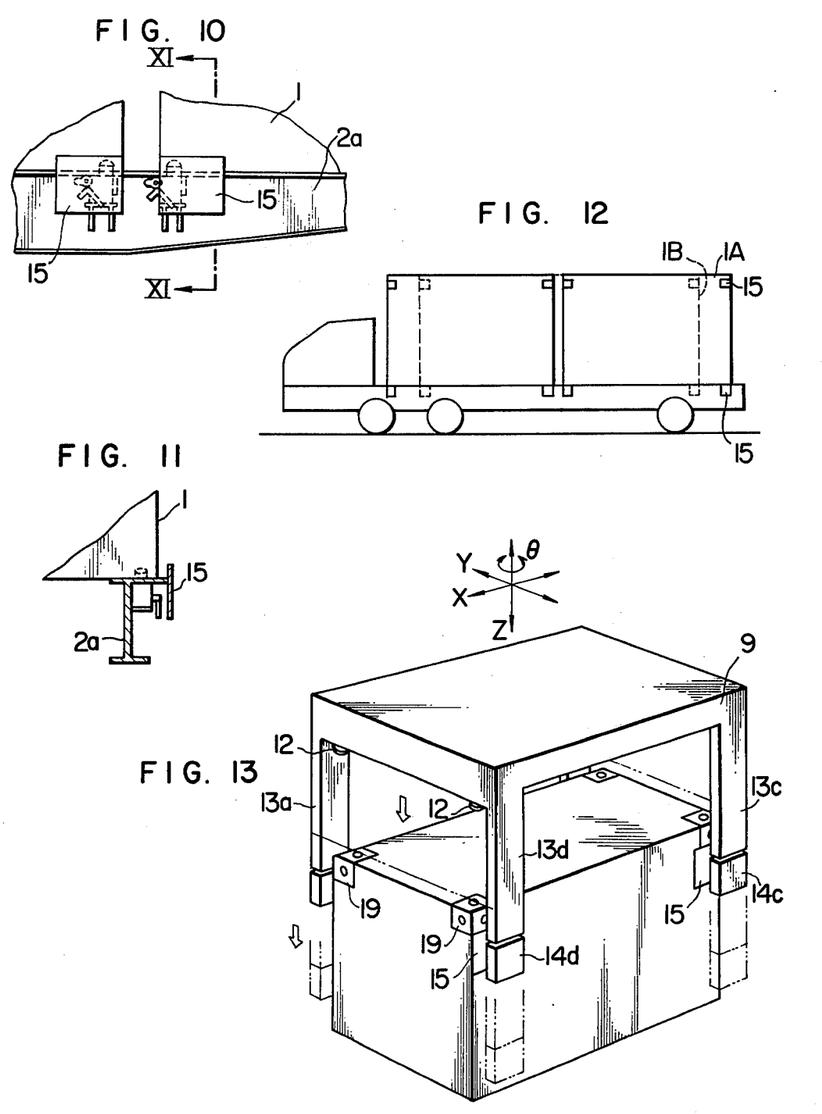
FIG. 10 is an enlarged view of a side portion A of the freight car shown in FIG. 9.
FIG. 11 is a view of the detecting plate as viewed along the line XI—XI in FIG. 10.
FIG. 12 is a front view of a truck having detecting plates attached thereto, shown with a plurality of containers loaded therein.
FIG. 13 is a view in explanation of a container grasping operation performed by the spreader.

FIGS. 9 to 11 show one of freight case 2 exclusively for containers to which the present invention is applied. Detecting plates 15 are attached to the side surfaces of the freight car at positions corresponding to those at which detecting plates 15 are attached to the five-ton container 1A and ten-ton container 1B. In this freight car, fourteen detecting plates 15 are attached to one side surface thereof so as to indicate the positions of five five-ton containers or three ten-ton containers on the freight car. As shown in FIGS. 10 and 11, the detecting plates 15 are disposed on a beam 2a of the freight car 2 such that the detecting plates 15 may not interfere with the actuation of clamping fixtures and may be disposed within a clearance limit for a rolling stock. In order that the detecting plates 15 provided on the containers as well as on the freight car can be detected by the sensors of the same non-contact type, the detecting plates 15 are attached to the bed and project upwardly therefrom, so that a space is created in the vertical direction of each detecting plate 15 to enable the detecting plates 15 of the container and freight car to be disposed under similar external conditions.

FIG. 12 shows one of the trucks 3 to which this invention is applied. The truck has attached to opposite sides of its bed the detecting plates 15 which are disposed in positions which correspond to opposite ends of the five-ton and ten-ton containers.

In operation, the spreader 9 of the container crane 5 is moved by travelling parts for the crane body 6 and the trolley 7, and roughly positioned in the X-direction and Y-direction with respect to the desired container 1. Then container loading and unloading operation is carried out. This operation involves transferring of the containers 1 from the bed of a truck 3 to the bed of a freight car 2 and vice versa. The positioning of the spreader 9 will be hereinafter described in detail with reference to transfer of a container from the bed of a truck 3 to the bed of a freight car 2.

Figure 14A:
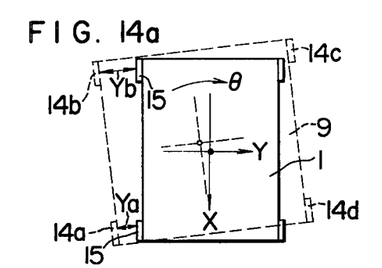
FIGS. 14a, 14b, 14c and 14d are views in explanation of the spreader positioning operation.
Figure 14B:
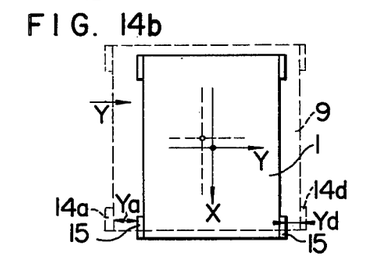

In grasping the container 1 on the bed of a truck 3 by means of the spreader 9, the sensor arms 13a–13d are contracted in telescopic motion and the sensor blocks 14a–14d are located in positions in which they are opposed to the upper marginal portions on opposite sides of the container 1 as shown in FIG. 13. Then positioning of the spreader 9 in the vertical direction is carried out by detecting the height of the container 1 on the bed of the truck. In case the spreader 9 slants in the θ-direction relative to the container 1 and their sides are not in parallel relation as shown in FIG. 14a, the Y·θ-direction detecting sensors 17 of the sensor blocks 14a–14d detect the difference between the distances Ya and Yb between the sensors 17 and the detecting plates 15 on one side of the container 1, and generate a signal for actuating the fine adjustment device 8 to reduce the difference to zero. As a result, the spreader 9 angularly rotates and becomes parallel to the container 1. Thereafter, in case the spreader 9 is not in agreement with the container 1 with respect to the central position thereof in the Y-direction, the Y·θ-direction sensors 17 of the sensor blocks 14a–14d detect the difference between the distances Ya and Yd between the sensors 17 and the respective sides of the container 1, and generates a signal for actuating the fine adjustment device 8 to reduce the difference to zero. Thus the spreader 9 is moved in the Y-direction and accurately positioned in the Y-direction with respect to the container.

Figure 14C:
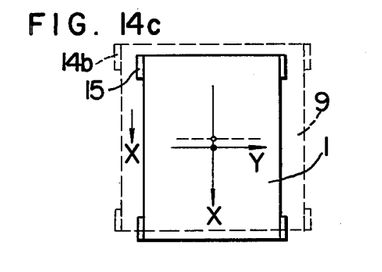
Figure 14D:
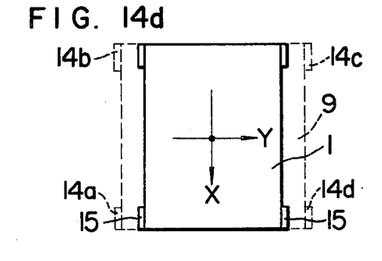

If the spreader 9 is not in agreement with the container 1 with respect to the central position thereof in the X-direction as shown in FIG. 14c, the X-direction detecting sensors 16a, 16b of the sensor blocks 14a, 14b, for example, generate ON-OFF action signals to actuate the fine adjustment device 8, so that the spreader 9 can be accurately positioned in the X-direction with respect to the container 1 as shown in FIG. 14d. Combined with the positioning of the spreader in the θ-direction and the Y-direction described above, the positioning thereof in the X-direction brings the spreader to a position in which the twist locks 12 are indexed with lock engaging openings formed in the container. The spreader 9 positioned accurately in this manner is moved downwardly toward the container 1 and then the twist locks 12 are inserted in the lock receiving openings in the container 1 and turned, so that the spreader 9 now grasps the container 1 and can hoist the same.

Figures 15, 16, 17:
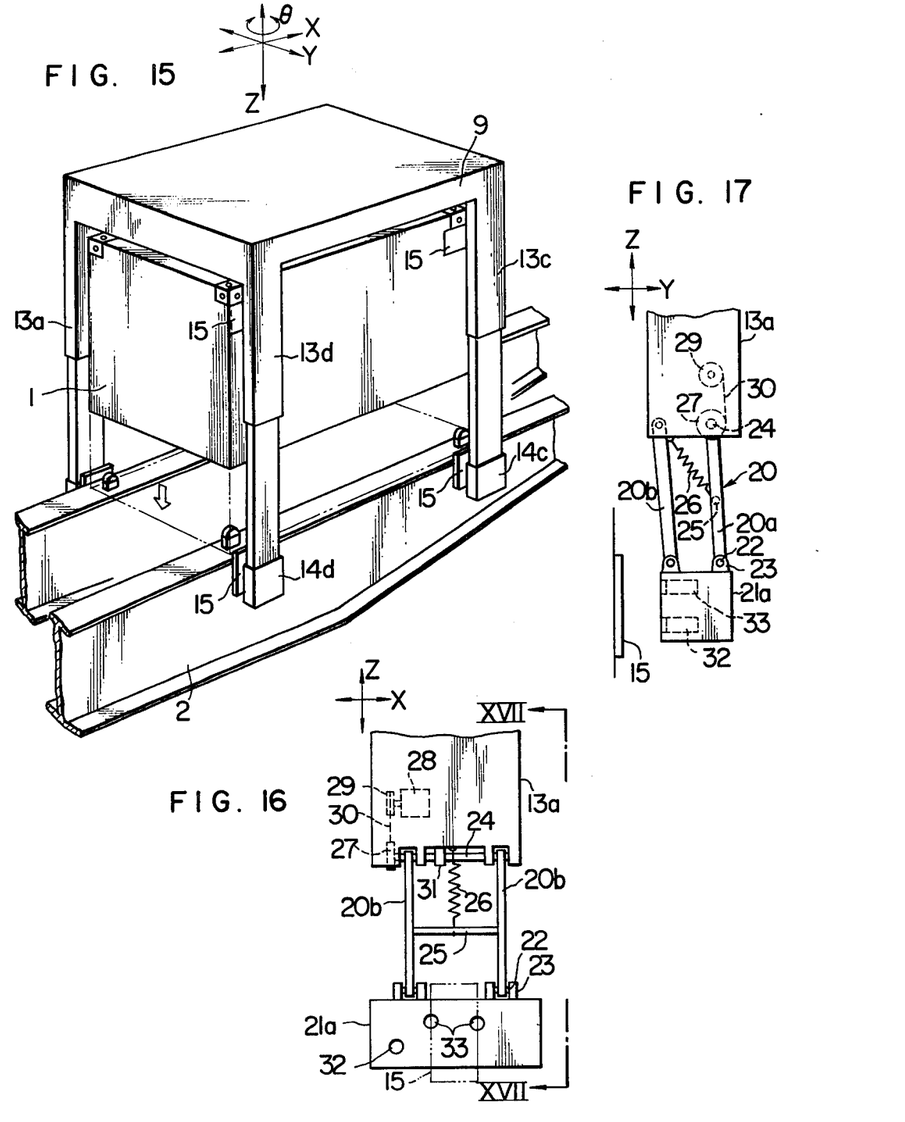
FIG. 15 is a view in explanation of the operation of loading a container on a freight car.
FIG. 16 is a front view of a modification of the sensor block or detecting plate according to the invention.
FIG. 17 is a side view of the sensor block of FIG. 16 as viewed along the line XVII—XVII in FIG. 16.

In transferring the container grasped by the spreader 9 to the bed of one of the freight cars 2, the sensor arms 13a–13d are telescopically extended until the sensor blocks 14a–14d are brought to positions in which they are in registration with the detecting plates 15 on opposite sides of the bed of the freight car. While the sensor blocks 14a–14d and the detected elements 15 are being positioned relative to one another in this manner, the sensors 16a, 16b, 17 and 18 generate signals to actuate the fine adjustment device 8, in the same manner as such sensors generate signals in positioning the spreader 9 with respect to the container 1 as previously described, so that the spreader 9 can be moved slightly and accurately positioned with respect to the loading frame of the freight car 2.

By performing operation steps similar to those operation steps which have been described above, it is possible to accurately position the spreader 9 when one of the containers 1 loaded on a freight car is transferred to the bed of a truck.

In the apparatus according to the invention, the detecting plates detected by the sensor for detecting the container loading and unloading positions are provided on opposite sides of the freight cars and trucks on which the containers are loaded or unloaded, as described in detail hereinabove. The present invention makes it possible to simplify the construction of the sensors of the non-contact type, particularly the sensors for detecting the X-direction deflection, for the purpose of detecting the relative positions of the spreader and a container or the bed of a freight car or a truck. As a result, the spreader positioning apparatus according to the present invention is lower in cost than similar apparatus of the prior art because the sensor blocks can be reduced in size.

Another advantage of the apparatus according to the invention is that it needs less number of sensors in the sensor blocks, thereby enabling maintenance and inspection of the sensors to be easily carried out and the reliability of the apparatus in performing spreader positioning to be increased.

FIGS. 16 and 17 show an alternative sensor which can be used in this invention. The sensor is of the contact type which includes sensor blocks provided with various kinds of sensors adapted to be brought into contact with an object, with respect to which the spreader 9 is to be positioned. Although only one sensor arm 13a supporting a sensor block 21a is shown, it is to be understood that other sensor arms 13b–13d supporting sensor blocks 21b–21d respectively of the same construction as the sensor block 21a are each mounted at one of four corners of the spreader 9 like the sensor arm 13a. The sensor block 21a is supported by the sensor arm 13a through a sensor linkage 20 including two parallel links 20a, 20b for movement inwardly of the spreader 9 or toward the object of detection. The sensor linkage 20 is rotatably connected at one end thereof through pins 22 to brackets 23 affixed to the upper surface of the sensor block 21a, and secured at the other end to rotary shafts 24 supported by the sensor arm 13a. The two outer parallel links 20a of the sensor linkage 20 is interconnected by a rod 25, and a resilient member 26 is mounted between the rod 25 and the lower end of the sensor arm 13a for urging by its biasing force the sensor block 21a to move inwardly of the spreader 9 through the sensor linkage 20. The rotary shaft 24 supporting the outer pair of links 20a is provided with a withdrawing device for moving the sensor block 21a outwardly of the spreader 9, including a motor 28 mounted within the sensor arm 13a, a pulley 29 secured to the output shaft of the motor 28, and a rope 30 trained around the pulley 29 and another pulley 27 secured to one end of the shaft 24. If the rope 30 is paid out by the operation of the motor 28, then the sensor block 21a is moved toward the object of detection by the biasing force of spring 26; if the rope 30 is wound, then the sensor block 21a is moved away from the object of detection against the biasing force of spring 26. The rope 30 trained around the pulleys 29 and 27 has a sufficiently great length to enable the sensor blocks 21a–21d to move in the Z-direction and Y-direction for providing a protection to the sensors mounted in the sensor blocks 21a–21d, when the sensor blocks 21a–21d hit the container, freight car or bed of a truck during the time detection of the object is being carried out.

The sensor arm 13a also includes a rotational angle detector 31 mounted in the vicinity of the rotary shaft 24 supporting the outer pair of links 20a for detecting the angle of rotation of such shaft. The rotational angle detector 31, which detects the angle of rotation of the shaft 24 and determines the amount of deflection of each of the sensor blocks 21a–21d in a direction toward or away from the object of detection, serves as a sensor for detecting the deflections of the spreader 9 in the Y-direction and $\theta$-direction with respect to the object of detection. The sensor block 21a is provided with a Z-direction detecting sensor 32 for detecting the position of the spreader 9 in the Z-direction, and two X-direction detecting sensors 33 for detecting the position of the spreader 9 in the X-direction. The Z-direction detecting sensor 32 is a sensor of the penetrating type, while the X-direction detecting sensors 33 are electromagnetic proximity type. The X-direction sensors 33 are mounted in the sensor block 21a in positions in which they detect the opposite longitudinal edges of a detecting plate 15 for positioning the spreader 9 in the X-direction with respect to the object of detection. In order to avoid damage which may suffer by contact during operation, the sensors 32 and 33 are mounted such that they are located back from the contact surfaces of the respective sensor blocks.

The detecting plates 15 which are also in the form of plates are attached to the containers 1, the freight cars 2 and the trucks 3 in the same positions as the detecting plate shown in FIGS. 8 to 12. Therefore, description of the details of the manner in which the detecting plates 15 used with the sensor of the contact type are attached will be omitted. It is to be understood, however, that the detecting plates used with the sensor of the contact type can be reduced in width as compared with the detecting plates 15 used with the sensor of the non-contact type, because the portion of each detecting plate to be detected by the Y-$\theta$-direction detecting sensor 31 can be eliminated due to the fact that the Y-$\theta$-direction detecting sensor 31 is mounted on the sensor linkage 20.

The operation of the apparatus provided with the sensor of the contact type will now be described. In grasping and loading or unloading a container 1, the spreader 9 is accurately positioned by being moved vertically (Z-direction), angularly ($\theta$-direction), transversely (Y-direction) and travelling direction (X-direction) in the indicated order. Positioning of the spreader 9 with respect to the container 1 will be described hereinafter.

First, the spreader 9 is brought to a position in which it is opposed substantially to the upper surface of the container 1, and then moved downwardly to a position in which the sensor blocks 21a–21d are opposed to the four sides of the container 1. Thereafter the motors 28 are actuated to pay out the ropes 30 so as to move the sensor blocks 21a–21d toward the spreader 9 by the biasing forces of springs 26 through the sensor linkages 20 into contact with the sides of the detecting plates 15 on the container 1. At this time, the rotational angle detectors 31 coupled to the sensor linkages 20 generate electric signals corresponding to the angles of rotation of the sensor linkages 20.

Figure 18A:
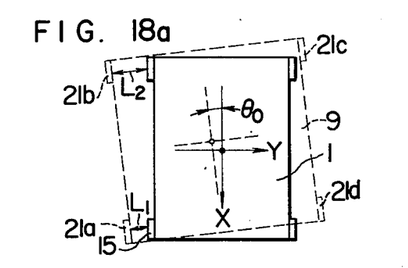
FIGS. 18a, 18b, 18c and 18d are views in explanation of the spreader positioning operation carried out by using an alternative sensor device.

If it is detected that the spreader 9 is twisted by an angle $\theta_o$ with respect to the container 1, as shown in FIG. 18a, then the distances $L_1$ and $L_2$ between the original positions of the sensor blocks 21a and 21b and the container 1 or the signals for the angles of rotation $\theta1$ and $\theta2$ of the sensor linkages 20 of the sensor blocks 21a and 21b are compared with each other, and the spreader 9 is moved in rotating motion by the fine adjustment device 8 in the $\theta$-direction until the difference between the signals becomes zero. Thus the spreader 9 is positioned parallel to the container 1 as shown in FIG. 18b.

Figure 18B:
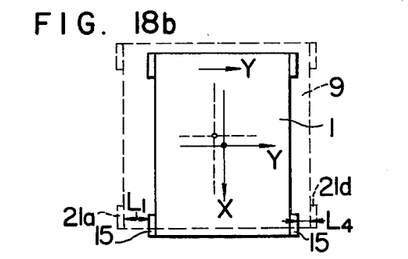

If the spreader 9 deflects in the Y-direction with respect to the container 1 as shown in FIG. 18b, then the sensor blocks 21a–21d are brought into contact with the detecting plates 15 on the container in the same manner as described above and the difference between the distances $L_1$ and $L_4$ between the original positions of the sensor blocks 21a and 21d and the container 1 or between the angles of rotation $\theta1$ and $\theta4$ of the sensor linkages 20 of the sensor blocks 21a and 21d are detected. The spreader 9 is moved by the fine adjustment device 8 in the Y-direction until the difference between the two values becomes zero. Thus the spreader 9 is brought to a position in which the longitudinal center line thereof is aligned with the longitudinal center line of the container 1, as shown in FIG. 18c.

Figure 18C:
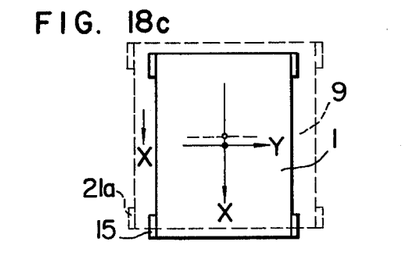
Figure 18D:
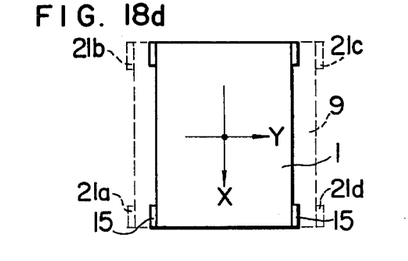

Then, if the spreader 9 deflectes in the X-direction with respect to the container 4, as shown in FIG. 18c, then the sensor blocks 21a–21d are brought into contact with the detecting plates 15, and the spreader is moved in the X-direction by the fine adjustment device 8 until the X-direction detecting sensors 33 of the sensor block 21a, for example, are all brought to ON positions. Thus the spreader 9 is positioned such that the center thereof is in registration with the center of the container 1 in the X-direction, as shown in FIG. 18d. After completion of this positioning action, the sensor blocks 21a–21d are returned to their inoperative or original positions by the action of the motors 28.

By performing a series of aforesaid operation steps, it is possible to accurately position the spreader 9 so that it can grasp the container 1 without any trouble.

Positioning of the spreader 9 with respect to the bed of a freight car or truck can also be achieved by performing the same operation as described hereinabove.

From the foregoing description, it will be appreciated that in the apparatus provided with the sensor device of the contact type, the sensor blocks provided with various types of sensors are brought into contact with the detecting plates attached to the containers and the bed of the freight cars and trucks for detecting the container loading and unloading positions. By bringing the sensors into contact with the detecting plates, the position of a spreader with respect to a container of a bed can be detected and the spreader can be correctly positioned with respect thereto. The sensor device of the contact type is similar in construction than that of the non-contact type and yet can exhibit the same excellent performance as the non-contact-type sensor. The apparatus according to the invention can be produced on a mass production basis because the cost for production can be minimized. An additional advantage is that since the apparatus can be used without being effected by the weather, it is highly reliable in performance.

What is claimed is:

1. A spreader positioning apparatus for automatically grasping handling articles of a rectangular parallelepiped shape wherein said spreader is first positioned in the vertical direction (Z) and then is slightly moved in the travelling direction (X), in the transverse direction (Y), and in the angular direction ($\theta$) about the center axis of the spreader so as to be accurately positioned with respect to one of such handling articles, to the loading bed of a freight car or a truck, such apparatus comprising:

a. detecting plates attached to the marginal portions of both sides of said handling articles and serving as targets for detection when a desired article is searched;

b. another detecting plates attached to the portions of the sides of the loading bed of freight cars or trucks carrying the articles thereon which portions register with the longitudinal edges of the handling articles, so that the detecting plates can serve as targets for detecting the position of the desired handling article on the bed;

c. a columnar member mounted on a trolley of a crane for vertical movement and supporting at its lower end said handling article grasping spreader through a fine adjustment device;

d. sensor arms connected to at least three of four corners of the spreader and adapted to be extended or contracted in the vertical direction;

e. sensor blocks each affixed to the lower end of said respective sensor arms; and f. sensor mounted on said sensor blocks for detecting deflection of the spreader in the Z-direction, Y-direction, $\theta$-direction and X-direction by using at least said detecting plates as targets for detection.

2. A spreader positioning apparatus for automatically grasping handling articles as set forth in claim 1, wherein said sensor blocks are of a non-contact type and affixed to the lower ends of the respective sensor arms in such a manner as to be spaced apart from the object being detected during the positioning operation.

3. A spreader positioning apparatus for automatically grasping handling articles as set forth in claim 2, wherein said sensor means mounted on said sensor blocks comprises at least X-direction detecting sensors of the non-contact type for detecting one edge portion of the detecting plates serving as targets for detection and supplying to the fine adjustment device signals for dictating the X-direction position, and Y and $\theta$-direction detecting sensors for detecting deflections of the sensors in Y and $\theta$-direction with respect to the detecting plates serving as targets for detection and supplying signals to the fine adjustment device to eliminate the deflections.

4. A spreader positioning apparatus for automatically grasping handling articles as set forth in claim 3, wherein said X-direction detecting sensors are photoelectric switches of a reflection type or a transmission type or ultrasonic switches, and said Y and $\theta$-direction detecting sensors are ultrasonic switches.

5. A spreader positioning apparatus for automatically grasping handling articles as set forth in claim 1 wherein said sensor blocks are of a contact type and are mounted on the lower ends of the sensor arms for movement toward the targets for detection from the lower ends of the sensor arms into contact with the targets for detection said sensor blocks being adapted to mechanically leave said targets for detection.

6. A spreader positioning apparatus for automatically grasping handling articles as set forth in claim 5 wherein the arrangement for connecting said sensor blocks to said sensor arms each comprises a sensor linkage having two pairs of parallel links for connecting each sensor block to the lower end of each sensor arm in such a manner that a surface of each sensor block adapted to come into contact with the associated detecting plate can move inwardly of the spreader; a resilient means mounted between each sensor arm and each sensor linkage for moving each sensor block inwardly of the spreader, and means for moving the detecting plate contacting surface of each sensor block outwardly of the spreader against the biasing force of each resilient means, and wherein said sensing means comprises at least X-direction detecting sensors mounted on the sensor blocks for detecting the opposite edges of the detecting plates serving as targets for detection and supplying to the fine adjustment device a signal for dictating the X-direction position of the spreader, and Y and $\theta$-direction detecting sensors mounted on the sensor linkages for detecting the angles of rotation of the sensor linkages so as to thereby detect deflections of the sensors in the Y-direction and $\theta$-direction with respect to the detecting plates serving as targets for detection and supplying signals to the fine adjustment device to eliminate the deflections.

7. A spreader positioning apparatus for automatically grasping handling articles as set forth in claim 6 wherein the X-direction detecting sensor comprises two electromagnetic proximity-type switches at least and the Y and $\theta$-direction detecting sensor comprises rotational angle detectors for detecting the rotational angle of each said sensor linkage.

* * * * *